(12) United States Patent
Gu et al.

(10) Patent No.: US 9,883,339 B1
(45) Date of Patent: Jan. 30, 2018

(54) METHOD OF SOCIAL-FENCING BASED ON PHYSICAL PROXIMITY

(71) Applicant: SYMANTEC CORPORATION, Mountain View, CA (US)

(72) Inventors: Lei Gu, Bedford, MA (US); Kevin B. Jiang, San Mateo, CA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/279,876

(22) Filed: Sep. 29, 2016

(51) Int. Cl.
H04W 24/00 (2009.01)
H04W 4/02 (2009.01)
H04L 29/08 (2006.01)

(52) U.S. Cl.
CPC .............. H04W 4/021 (2013.01); H04L 67/22 (2013.01); H04L 67/306 (2013.01); H04W 4/028 (2013.01)

(58) Field of Classification Search
CPC ...... H04W 4/021; H04W 4/028; H04L 67/22; H04L 67/306
See application file for complete search history.

(56) References Cited

U.S. PATENT DOCUMENTS

| 2006/0256959 | A1* | 11/2006 | Hymes | H04M 1/26 379/433.04 |
| 2014/0141813 | A1* | 5/2014 | Johnson | H04W 4/02 455/456.3 |
| 2015/0099550 | A1* | 4/2015 | Alharayeri | H04W 4/023 455/456.3 |
| 2016/0119963 | A1* | 4/2016 | Casati | H04W 76/023 455/434 |
| 2017/0091699 | A1* | 3/2017 | Mueller | G06Q 10/083 |
| 2017/0118210 | A1* | 4/2017 | Athias | H04L 63/0876 |
| 2017/0245106 | A1* | 8/2017 | Connelly | H04W 4/021 |

* cited by examiner

Primary Examiner — Ajit Patel
(74) Attorney, Agent, or Firm — Rory D. Rankin; Meyertons, Hood, Kivlin, Kowert & Goetzel, P.C.

(57) ABSTRACT

A system and method for establishing patterns of social behavior for users of mobile devices. An administrator registers a person of interest with a service by identifying a mobile device used by the person of interest and generates one or more rules. The registered mobile device monitors network traffic of other surrounding mobile devices and sends their unique identifiers to the service. The service accesses one or more registries to identify users associated with the other surrounding mobile devices. The service determines whether any rule infractions occur based on one or more of the identified users, distances between the registered mobile device and other surrounding devices, frequencies of occurrences of mobile devices being relatively near and detected time periods. If any rule infractions occur, then the service generates an alert and sends it to the administrator.

20 Claims, 7 Drawing Sheets

METHOD OF SOCIAL-FENCING BASED ON PHYSICAL PROXIMITY

BACKGROUND OF THE INVENTION

Field of the Invention

This invention relates to the field of mobile device communication and, more particularly, to establishing patterns of social behavior for users of mobile devices.

Description of the Related Art

Location tracking devices may be used to track the movements of people. Such tracking may serve to provide security and may allow expectations to be set for arrivals and departures at particular locations. In some cases, a trackable device may be used for tracking a person of interest such as a child or a senior citizen. The trackable device itself may, for example, be a global positioning system (GPS) based device. Once registered with a tracking service, a policy for the person of interest may be put in place.

For example, the policy may define allowable areas for the person of interest and an action to take when the person of interest varies from those allowable areas. The allowable area that is defined may be set up as a virtual perimeter around a geographic area. Such a defined allowable area may be referred to as a geofence. While geofences may be used to determine entry and exit to predefined areas, they do not provide other information such as the identification of other persons who are spending time with the person of interest or the identification of others who are in close proximity to the person of interest. Consequently, there is no indication that one or more inappropriate persons may be near the person of interest. For example, a child may typically spend time with a school's swim coach at school. However, should the swim coach also spend time with the child outside of school, such as at a friend's house, a parent may wish to be notified.

In view of the above, improved systems and methods for establishing patterns of social behavior for users of mobile devices are desired.

SUMMARY OF THE INVENTION

Systems and methods for establishing patterns of social behavior for users of mobile devices are contemplated. In various embodiments, an administrator registers a mobile device used by a person of interest with a monitoring service. In various embodiments, the monitoring service includes a software application run on a server or other computing device. The person of interest could be a child, a senior citizen, or otherwise, and the administrator may be a parent or other family member.

The mobile device may be a smartphone, a smartwatch, a tablet computer, or other device that includes the capability to monitor network traffic of other relatively near mobile devices. For example, in some embodiments, each of the mobile device and other nearby mobile devices broadcasts requests to a router, such as a Wi-Fi router. When operating in a given mode, the network interface controller (NIC) of the mobile device, whether it is wired or wireless, monitors the broadcast requests. The NIC of the mobile device passes each detected request it obtains to a processing unit, rather than only those that are targeted to the mobile device. The requests include unique identifiers of mobile devices communicating on the network. In various embodiments, the unique identifiers are media access control (MAC) addresses. The mobile device then sends at least the obtained unique identifiers to the service. In various embodiments, the service is a Cloud-based service run on the server.

After receiving the unique identifiers of mobile devices from the registered mobile device of the person of interest, the service evaluates whether unexpected behavior has occurred. Unexpected behavior is presumed to occur when rule infractions occur. Such rules may have been generated for the person of interest by an administrator. In various embodiments, rules may be based on determining the physical proximity of mobile devices used by the person of interest and others. For example, a rule may be established that identifies a particular identifier as being associated with a prohibited person. The administrator may have already set up a list of unique identifiers of mobile devices associated with prohibited persons.

In order to identify the users associated with the mobile devices corresponding to the received unique identifiers, the service may access one or more data sources. The person of interest's mobile device, or the service running on the server, may maintain a personal registry which maps unique identifiers to identities of users. In addition, crowdsourced databases may be used. In various embodiments, the identities of persons associated with identifiers may include one or more of a name of the user, a job title of the user, a student status of the user, hobbies or other interests of the user, an age or age range of the user, and so on.

These and other embodiments will be appreciated upon reference to the following description and accompanying drawings.

Figure 1:
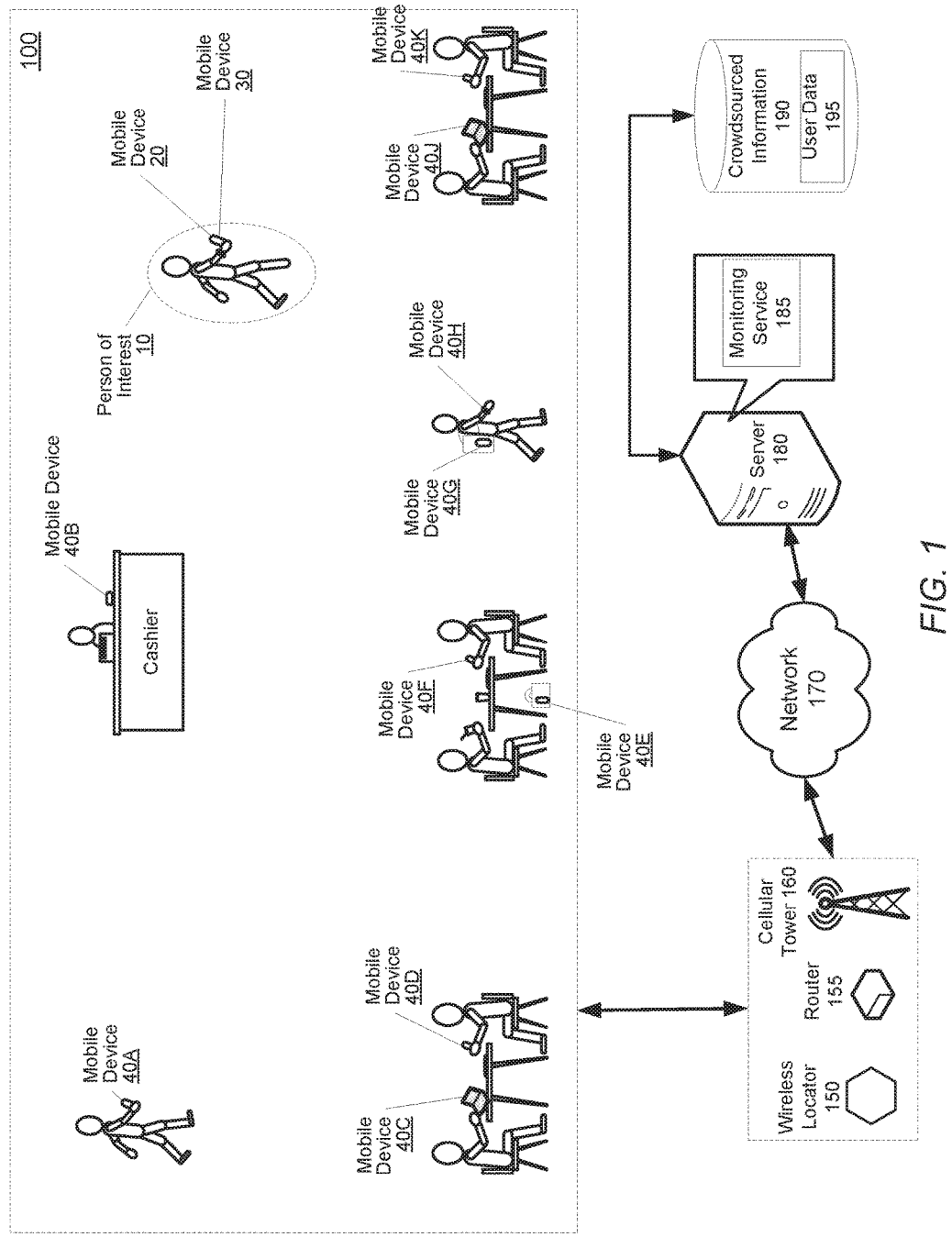
FIG. 1 is a generalized block diagram illustrating one embodiment of monitoring social behavior of a person of interest in a geographical area through monitoring network traffic of surrounding mobile devices.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

In various embodiments, monitoring the network communication traffic of mobile devices is used to monitor the physical proximity of mobile devices to one another. Based on this information, the physical proximity of users associated with the mobile devices may be presumed. In the described system, a registered user (e.g., administrator) sets up rules to monitor and determine whether rule infractions occur. For example, a parent may wish to know if a child is spending a significant amount of time with a person deemed to be a negative influence. In such a case, the parent may establish a rule that includes detecting the presence of that person in close proximity to their child. Alternatively, a family member may wish to know whether realtors or other salespeople are stopping by the residence of an elderly parent or grandparent in order to offer bad deals. The physical proximity of the registered mobile device and mobile devices associated with other people can be used to determine whether rule infractions occur. The rules set up by the administrator describe detecting such scenarios for the person of interest.

As will be described in greater detail, the identities of users can be determined based on unique identifiers associated with mobile devices. Mobile device and other relatively near mobile devices communicates with a wireless locator such as a beacon, a network router, or otherwise. When operating in a monitor or promiscuous mode, the registered mobile device monitors the communication and determines the unique identifiers of the other mobile devices.

Referring to FIG. 1, a generalized block diagram of one embodiment of monitoring social behavior of a person of interest by monitoring network traffic of mobile devices is shown. In the embodiment shown, a person of interest 10 is a person carrying a registered mobile device. In some embodiments, the person of interest 10 is a child. In other embodiments, the person of interest 10 is a spouse, a senior citizen, a housekeeper, a friend or client recovering from chemical dependency and so on. As shown, the person of interest 10 is associated with two mobile devices 20 and 30. In some embodiments, the mobile device 20 is a smartwatch and the mobile device 30 is a smartphone. In various embodiments, an administrator (not shown) previously registered one or more of the mobile devices 20 and 30 with a monitoring service 185. The administrator may be a parent, another family member, a caretaker or a guardian, a lawyer, a counselor, or otherwise. As shown, the monitoring service 185 is processed on a remote server 180. However, in other embodiments, the monitoring service 185 is processed on the registered mobile device or another computing device.

As shown, the person of interest 10 is located at a geographical location 100 with multiple other persons. The geographical location 100 can be a food court, a cafeteria at a school, a café, or otherwise, and may be either an indoor or outdoor location. Also illustrated are one or more other mobile devices 40A-40K. In various embodiments, each of the mobile devices 40A-40K may be a smartphone, a smartwatch, a tablet computer, a laptop, a netbook computer, and so on.

As briefly described earlier, an administrator set up, or registered, an account with the monitoring service 185 and identifies one or more of the mobile devices 20 and 30 to be associated with the person of interest 10. To identify one or more of the mobile devices 20 and 30, the administrator may provide a unique identifier during the registration process with the monitoring service 185. In various embodiments, the unique identifier for the mobile devices 20, 30 and 40A-40K is a media access control address (MAC address) assigned to network interfaces for communications via a network. The MAC address is used as an address in most IEEE 802 network technologies, including Ethernet and Wi-Fi. In other embodiments, an identifier other than a MAC address may be used to identify given devices. Given the tracked devices themselves are typically mobile, the administrator may assume the geographical location of the mobile devices 20, 30 and 40A-40K correlates with the geographical location of the users associated with the mobile devices 20, 30 and 40A-40K.

When registering one or more of the mobile devices 20 and 30, the administrator may set up an expected schedule for the person of interest 10. The expected schedule may include expected geographical locations to be visited by the person of interest 10 at expected times. For example, in some embodiments, the person of interest 10 is a child and the schedule includes times for daily school attendance, free time after school to spend with friends at the friend's house, time for providing or receiving afterschool tutoring, time for helping with chores at home, time for any extracurricular activity practices, matches, performances or other events and so forth. In other embodiments, the person of interest 10 is a senior citizen and the schedule includes doctor and/or physical therapist appointments, time for social gatherings with other senior citizens at a center or other locale, and so on. Various other examples of the person of interest 10 and corresponding schedules are possible and contemplated.

The expected schedule may be used for generating rules which may indicate expected behavior of the person of interest 10. In addition to the expected schedule, the rules may include identification of persons indicated as permissible persons with whom to spend time during given time periods. Further, the rules may include identification of persons indicated as prohibited persons with whom to spend time during given time periods. Further still, the rules may include maintaining a count of a number of times or an amount of time the person of interest 10 is permitted to spend time with a given other person. The count may be based on at least whether the person is known or unknown. The count may also be based on the geographical location, the time period, identification of particular other persons being present and so on.

As the rules may include an identification of persons that are permitted and prohibited from associating with the person of interest 10, the administrator and/or the monitoring service 185 provides the identification of the other persons. The identification of the other users associated with the other mobile devices 40A-40K may be mapped to the unique identifiers of the mobile devices 40A-40K. Therefore, at least one condition which causes one or more rule infractions includes determining the user associated with one of the other mobile devices 40A-40K is identified as a prohibited user. Similarly, the identification of the person of interest 10 associated with the mobile devices 20 and 30 may be mapped to the unique identifiers of the mobile devices 20 and 30. In one example, the administrator may know one or more of the users associated with the mobile devices 40A-40K and provide the mappings to a personal registry stored on the server 180 or on one of the mobile devices 20 and 30 of the person of interest 10.

In another example, the monitoring service 185 may access crowdsourced information 190 stored in a database to identify one or more users from the user identities 195 associated with the mobile devices 40A-40K. In some embodiments, the crowdsourced information 190 is maintained on a community basis, such as for a given sports team, a given school district or a given neighborhood. In other embodiments, crowdsourced registries is maintained for a given city, a given state, or other larger geographical areas. In some embodiments, the crowdsourced information 190 has been obtained from other administrators collecting and updating the user identities 195 associated with the mobile devices 20, 30 and 40A-40K. The history information may have also been obtained from responses to surveys regarding providing identification information. Still further, the crowdsourced information may be based on information in other public and/or private databases (whether owned by the service provider or not) that associates users with an identification of a device. For example, in some embodiments, a social networking service may have user related information that it makes available to the service provider via a license agreement or otherwise. A variety of different methods for obtaining the user identities 195 in the crowdsourced information 190 are possible and are contemplated.

The identification of the users provided by the administrator in a personal registry or stored in the crowdsourced information 190 may include one or more of a name of the user, a job title of the user, a student status of the user, hobbies or other interests of the user, an age or age range of the user, and so on. In addition, an indication of a permitted or prohibited status may be included in the identification. Alternatively, the indication of a permitted or prohibited status is not determined until control logic in the monitoring service 185 determines the status. In various embodiments, determining the user associated with another mobile device is identified as a prohibited user includes accessing an account associated with the registered mobile device, and determining the unique identifier corresponding to the other mobile device is identified as corresponding to a prohibited user.

In various embodiments, the administrator may generate rules at the time of registering one or more of the mobile devices 20 and 30 with the monitoring service 185. In addition, the administrator may update the rules over time. Further, the monitoring service 185 may include initial default rules that may be replaced or revised at a later time. When the monitoring service 185 determines rule infractions occur, the monitoring service 185 generates an alert. The monitoring service 185 can send the alert to one or more computing devices accessible by the administrator. For example, the monitoring service 185 can send a text message to a smartphone or a smartwatch. The monitoring service 185 can also send an email and a push notification.

When generating the rules to be used by the monitoring service 185, the administrator may presume the physical location of the mobile devices 20 and 30 is the same or within a proximity threshold of the physical location of the person of interest 10 (i.e., is near to or within a given distance of the person of interest). Additionally, the administrator presumes the physical location of the mobile devices 40A-40K is the same or within a proximity threshold of the users associated with the mobile devices 40A-40K. Therefore, the administrator may rely on mappings between the unique identifiers of the mobile devices 20, 30 and 40A-40K and the stored identities of the person of interest 10 and the other persons associated with the mobile devices 40A-40K.

As described earlier, the unique identifiers of the mobile devices 20, 30 and 40A-40K may be assigned media access control addresses (MAC addresses) for communication. In various embodiments, one or more of the mobile devices 20, 30 and 40A-40K communicate with one or more a wireless locator 150, such as a beacon, a router 155, such as a Wi-Fi router or node, and a cellular tower 160. Additionally, they can receive packets transmitted by other devices. Such transmissions may be broadcast, multicast, and/or unicast. In various embodiments, each of the beacon and the mobile devices 20, 30 and 40A-40K uses wireless technology, such as Bluetooth low energy (BLE) technology or otherwise, to communicate. The beacon may be used to further determine the location of the user associated with one of the mobile devices 20, 30 and 40A-40K. For example, the beacon can provide information that can be used to determine the mobile device is at the front of the food court or cafe, the back, at the cash register, and so forth.

The cellular tower 160 may be used as part of a cellular provider for a given one of the mobile devices 20, 30 and 40A-40K. For example, the cellular tower 160 may be part of a global system for mobile communications (GSM) cell network providing protocols for digital cellular networks. Alternatively, the cellular tower 160 is part of a code division multiple access (CDMA) cell network also providing protocols for digital cellular networks. The cell network may communicate with mobile devices and send data to the server 180. In various embodiments, the cell network encrypts the data prior to sending it to the server 180. Similarly, the router 155 may encrypt data before sending it to the server 180.

While each of the mobile devices 20, 30 and 40A-40K communicates with one or more of the wireless locator 150, the router 155 and the cellular tower 160, one or more of the mobile devices 20 and 30 monitors the communications. The one or more of the mobile devices 20 and 30 may monitor the communications when operating in a given mode, such as a monitor mode or a promiscuous mode. Generally speaking, a monitor or promiscuous mode is a mode for a wired or wireless network interface controller of a device that causes the device to examine all traffic seen on the network—even those not targeted to the device. While it may not generally be possible to see all of the contents of the packets received, it is possible to identify a unique identifier (such as a MAC address) within each packet. As each mobile device has an associated unique MAC address, packets corresponding to particular mobile devices can be identified. In various embodiments, the one or more of the mobile devices 20 and 30 intercepts packets used in the communication and retrieves the unique identifiers used in the packets. In this manner, assuming various devices have a limited transmission range, a device receiving such a packet may determine that a device associated with a given identifier in the packet is relatively nearby.

In some embodiments, the total number of packets detected in the communications may be relatively large. Therefore, the one or more of the mobile devices 20 and 30 may be configurable to filter the received communications to select particular packets for examination in order to reduce the number of packets examined. Afterward, the one or more of the mobile devices 20 and 30 may send the retrieved unique identifiers to the monitoring service 185 where the unique identifiers are mapped to identities of users (if that information is available) and it is determined whether rule infractions occur. As described earlier, the rules may be based on the physical proximity of the mobile devices 40A-40K to one or more of the mobile devices 20 and 30 associated with the person of interest 10. In addition, the rules may utilize indications of time and geographical locations provided by global positioning system (GPS) information.

When the one or more of the mobile devices 20 and 30 sends the retrieved unique identifiers to the monitoring service 185, network 170 may be used. Network 170 may include multiple switches, routers, cables, wireless transmitters and the Internet for transferring messages and data. In some embodiments, each of the mobile devices 20, 30 and 40A-40K and its support for various other devices and communication technologies and protocols contribute to the growth of the Internet of Things (IoT). The Internet of Things (IoT) is a network of physical objects that exchange data via the existing Internet infrastructure.

Figure 2:
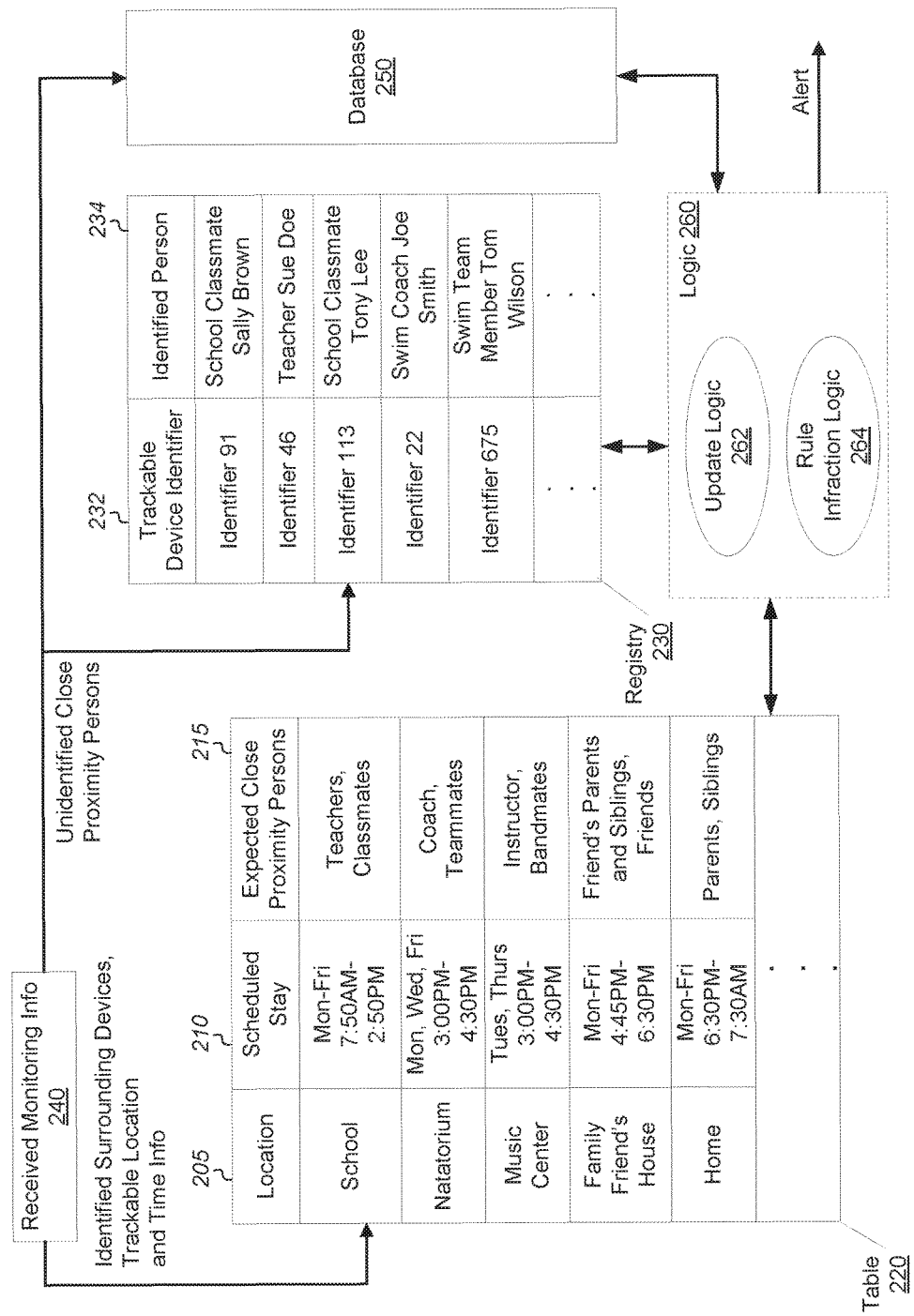
FIG. 2 is a generalized block diagram illustrating one embodiment of control logic and data structures used for determining whether physical proximities of mobile devices are valid.

Turning now to FIG. 2, a generalized block diagram of one embodiment of control logic and data structures for use in the system of FIG. 1 is shown. The control logic and data structures shown may be used by a monitoring service running on a registered mobile device, a remote server or other computing device. As shown in the illustrated embodiment, the received monitoring information 240 is used to access the table 220 and/or registry 230. The received information 240 may include one or more of unique identifiers of mobile devices, geographical information, indications of physical proximity between a registered mobile device and other devices, an indication of a time, and so forth. The geographical location information may be based on a global positioning system (GPS) or radio within the registered mobile device, which receives coordinates from one or more satellites. In addition, the mobile device can include a subsystem for wireless access point triangulation.

Each entry of the table 220 may store information within multiple fields. For example, the field 205 stores an indication of a location (e.g., latitude/longitude, a Name associated with a location, address, etc.), the field 210 stores an indication of a scheduled stay at the location, and the field 215 stores an indication of expected persons with close proximity to a person of interest during the scheduled stay at the location. The table 220 may include different and/or additional fields which are not shown for ease of illustration. For example, an additional field may store an indication of the unique identifiers of mobile devices. The unique identifiers of the mobile devices may be used to additionally identify users assumed to be associated with the mobile devices. The additional fields may further store metadata, such as an indication of a valid entry, and a type of alert to send when rule infractions are found. Various other examples of information to store in the entries are possible and contemplated. The entry identified by indexing into the table 220 has its corresponding information read out and provided to the control logic 260.

In some embodiments, a mapping to a user may not found in the table 220 for a received unique identifier of a mobile device. Accordingly, one or more other data structures such as registry 230 may be accessed. In the example shown, each entry of the registry 230 stores mappings. For example, unique identifiers associated with devices are stored in field 232 and identification of a corresponding users is stored in field 234. It is noted that the identified person field 234 may identify a particular establishment (e.g., a restaurant) or other entity rather than a particular person. Similar to the entries of table 220, the entries in the registry 230 may include one or more additional fields to store metadata and other information. In various embodiments the registry 230 may be based at least in part on information sourced from other sources, such as other service provider databases, publicly available information, crowdsourced information, and so on. The information stored in the entries of the registry 230 may include one or more of a name of the user, a job title of the user, a student status of the user, hobbies or other interests of the user, an age or age range of the user, and so on. In addition, an indication of a permitted or prohibited status may be included in the identification of the user associated with the mobile device. Alternatively, the indication of a permitted or prohibited status is not determined until rule infraction control logic 264 determines the status.

If the registry 230 includes an entry for a received unique identifier which was not found in the table 220, then the information stored in the corresponding entry may be sent to the update logic 262. The update logic 264 may update one or more entries of the table 220 based on the found unique identifier. If the registry 230 does not include an entry for a received unique identifier, then an additional data structure may be searched. As shown, the database 250 may be searched. Entries of the database 250 may store similar information as the entries of the registry 230, but the entries may correspond to a larger geographical area. For example, the information stored in the registry 230 may be maintained at a level of a school district or neighborhood. The information stored in the database 250 may be maintained at a state level or at a nationwide level. Other levels or granularities for maintaining mapping information between unique identifiers of mobile devices and users associated with the mobile devices are possible and contemplated.

The rule infraction logic 264 may receive information from one or more of the table 220, the registry 230 and the database 250. The rule infraction logic 264 may determine whether conditions set by an administrator for the person of interest are met or violated. For example, one or more users associated with mobile devices determined to be currently near the mobile device of the person of interest may be labeled as prohibited persons. The names, job titles, age ranges or other information may be used to determine the persons are prohibited or warrant an alert. In addition, the location or current time may be used to determine the persons are prohibited or warrant an alert.

The formulas in the rule infraction logic 264 used to determine whether rule infractions occur may be programmed by registered user or service provider. Alternatively, one or more formulas may be preset and presented during registration to the administrator as suggested formulas to use. The formulas may be used to cover a variety of scenarios. For example, a parent may find out when a child has met a new friend. In such a case, a mobile device associated with the new friend may be an unidentified mobile device that remains unidentified until the monitoring service associates the unique identifier of the mobile device with the new friend in a registry. This association may be based on information provided by the registered user.

The registered mobile device may monitor communication of the other mobile device associated with the new friend. The unique identifier of the other mobile device is retrieved by the registered mobile device and sent to the monitoring service as the monitoring information 240. If the other mobile device is in a registry accessed by the monitoring service, such as table 220, registry 230 or database 250, then the other mobile device is identified and the identification may be presented to the registered user (parent). If the other mobile device is not already stored in a registry accessed by the monitoring service, then the parent may update one or more registries upon learning the identity of the new friend. For example, the child may provide the identification, the new friend may provide the identification, a parent of the new friend may provide the identification, the parent may view a social network service post that shows the child with the new friend, and so forth.

The control logic and data structures shown in FIG. 2 may be used to inform the administrator, such as a parent, with whom their child has been spending time, where and what time of the day the child has been spending time with others, whether their child has made new friends, whether their child is eating lunch alone, whether their child is going to certain places with the people he or she claims to be with. In various embodiments, the received monitoring information 240 may be stored to gather information over time, such as day or week. The stored information may be presented later to the administrator when the administrator (registered user) logs in to an account corresponding to the monitoring service. Additionally, the stored information may be input to control logic, such as the rule infraction logic 264, to determine whether alerts should be sent.

In various embodiments, the registered mobile device may send monitoring information 240 to the monitoring service at a given frequency which is configurable. The frequency may change automatically based on the time of day. For example, when the person of interest is a child at school, the frequency may be reduced. However, when the person of interest is a child out with friends, the frequency may be increased. Additionally, the frequency may be adjusted based on a number of alerts. For example, the frequency may be programmable to automatically increase as the number of alerts increase. Additionally, the frequency may be programmable to adjust based on the geographical location and a variety of other factors.

In various embodiments, the registered mobile device sends an indication of signal strength between the registered mobile device and another mobile device as part of the monitored information 240. The indication of the signal strength can be used by the control logic 260 for determining the distance between the two mobile devices. The administrator, such as a parent, can be notified by the monitoring service when the child appears to deviate from typical social behavior. For example, the monitoring service can present data that the registered mobile device at school lunchtime is no longer near other mobile devices associated with typical friends, which indicates the child is eating with a different group or alone.

Using one or more of the control logic and data structures shown in FIG. 2, the monitoring service can also present data to the administrator when the person of interest associated with the registered mobile device spends a significant amount of time with an unidentified person. The monitoring service may have determined a given mobile device associated with the unknown person is relatively near the registered mobile device for some amount of time, but the registries do not provide any user identification being mapped to the unique identifier of the given mobile device.

Similarly, the administrator may determine from the alerts and information presented by the monitoring service when the child is spending time with another person other than a known friend at the friend's house, the child is being stalked, and so on. Likewise, the administrator may determine from the alerts and information presented by the monitoring service when an elderly family member or friend is being visited by unknown individuals such as aggressive sales-people. At least the physical proximity of the registered mobile device and the mobile devices associated with other people can be used to determine whether rule infractions occur.

Figure 3:
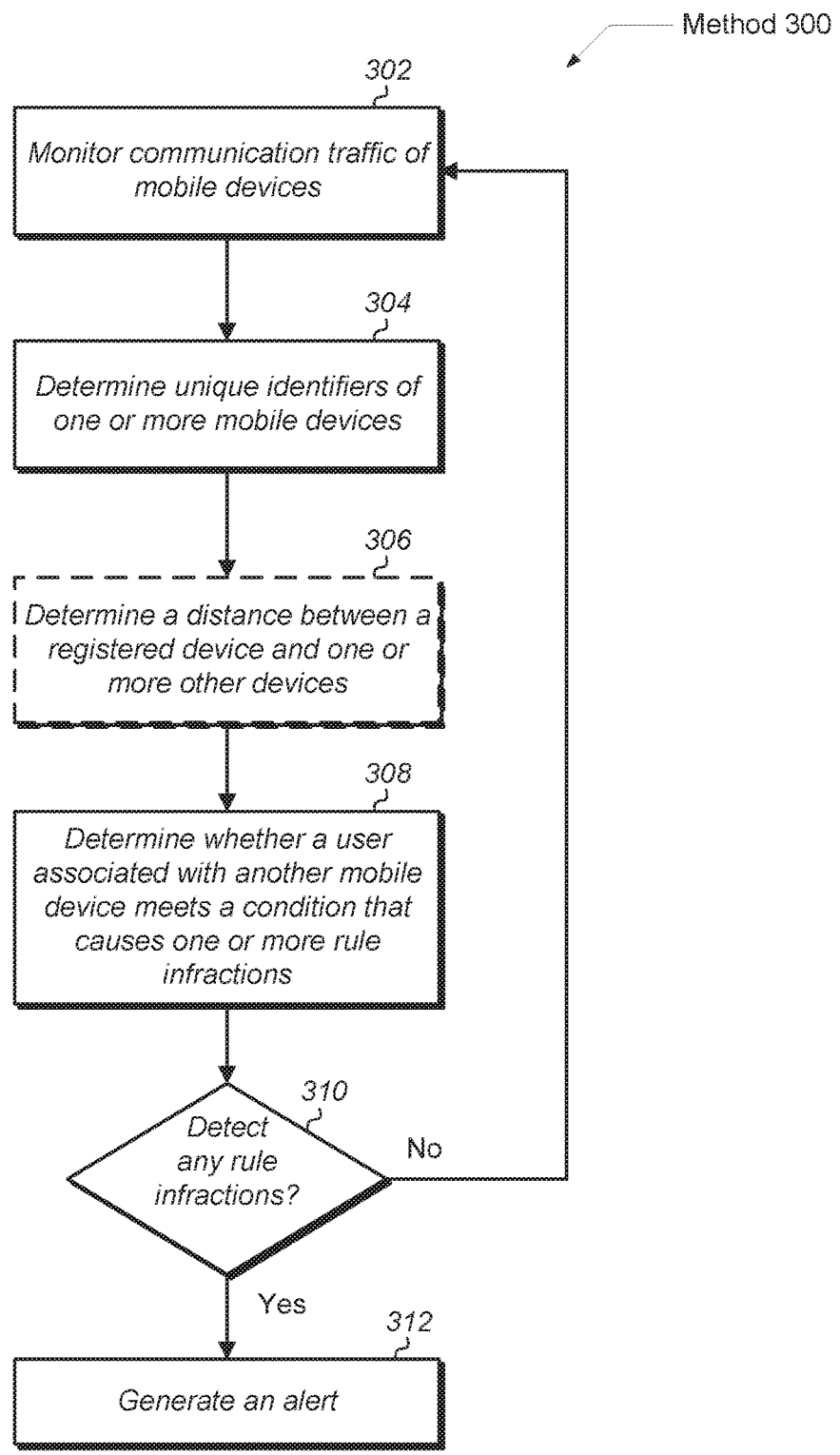
FIG. 3 is a generalized flow diagram illustrating one embodiment of a method for monitoring physical proximity of mobile devices using communication of the mobile devices.

Turning now to FIG. 3, one embodiment of a method 300 for monitoring physical proximity of mobile devices using communications of the mobile devices is shown. For purposes of discussion, the steps in this embodiment (and embodiments for FIGS. 4-7) are shown in sequential order. However, some steps may occur in a different order than shown, some steps may be performed concurrently, some steps may be combined with other steps, and some steps may be absent in another embodiment.

In the method 300 shown, a registered mobile device detects and monitors communication traffic (block 302). The registered mobile device may be a smartphone, a smartwatch, a tablet computer, a laptop, a netbook and so on. When operating in a given mode, such as a monitor mode or a promiscuous mode, the mobile device monitors communications within a detectable range. In various embodiments, the communication traffic includes network packets sent to and/or received from a Wi-Fi network router. Therefore, the mobile device is able to capture wirelessly the transmitted data of one or more other mobile devices.

In various embodiments, the registered mobile device passes each packet it obtains to a processor, rather than passing only packets identified as packets intended for the registered mobile device. The packets include unique identifiers of mobile devices communicating on the network. In various embodiments, the unique identifiers are media access control addresses (MAC addresses). The registered mobile device determines the unique identifiers for one or more mobile devices (block 304). For example, the registered mobile device is aware of its own unique identifier. If no other mobile devices are communicating within the range, which may imply the user associated with the registered mobile device is alone, then there is only one unique identifier to determine. Otherwise, the registered mobile device determines the unique identifiers of other mobile devices through "packet sniffing," or retrieving the unique identifiers from packets received by the mobile device and passed to the processor. Therefore, the registered mobile device is able to identify the unique identifier of other mobile devices within the wirelessly transmitted data.

The registered mobile device may also (optionally) estimate or determine a distance between itself and one or more other mobile devices (block 306). For example, in some embodiments the registered mobile device may use the range of the Wi-Fi network router as an estimated distance. In other embodiments, the registered mobile device uses an indication of signal strength between itself and another mobile device. In yet other embodiments, the registered mobile device uses a beacon to indicate the distance between itself and another mobile device. The registered mobile device can use a variety of methods for determining the distance between itself and one or more other mobile devices. By doing so, the registered mobile device may detect one or more other mobile devices are within close proximity to it.

In some embodiments, the registered mobile device includes a monitoring service. In other embodiments, the monitoring service is run on a remote server or other computing device. The registered mobile device sends the retrieved unique identifiers along with any estimations of distance to the monitoring service. The monitoring service determines whether any rule infractions have occurred (block 308). As described earlier, a variety of rules and other input information may be used to determine whether rule infractions occur. For example, the monitoring service may determine whether a user associated with another mobile device meets a condition that causes one or more rule infractions.

If the monitoring service determines any rule infractions have occurred ("yes" branch in the conditional block 310), then the monitoring service may generate an alert (block 312). In some embodiments, alerts may be enabled or disable as desired. The monitoring service can send the alert to one or more computing devices accessible by the administrator. For example, the monitoring service can send a text message or email to a smartphone or a smartwatch. If the monitoring service determines no rule infractions have occurred ("no" branch in the conditional block 310), then control flow of method 300 returns to block 302. In some embodiments, the monitoring service stores the received information for later viewing by the administrator.

Figure 4:
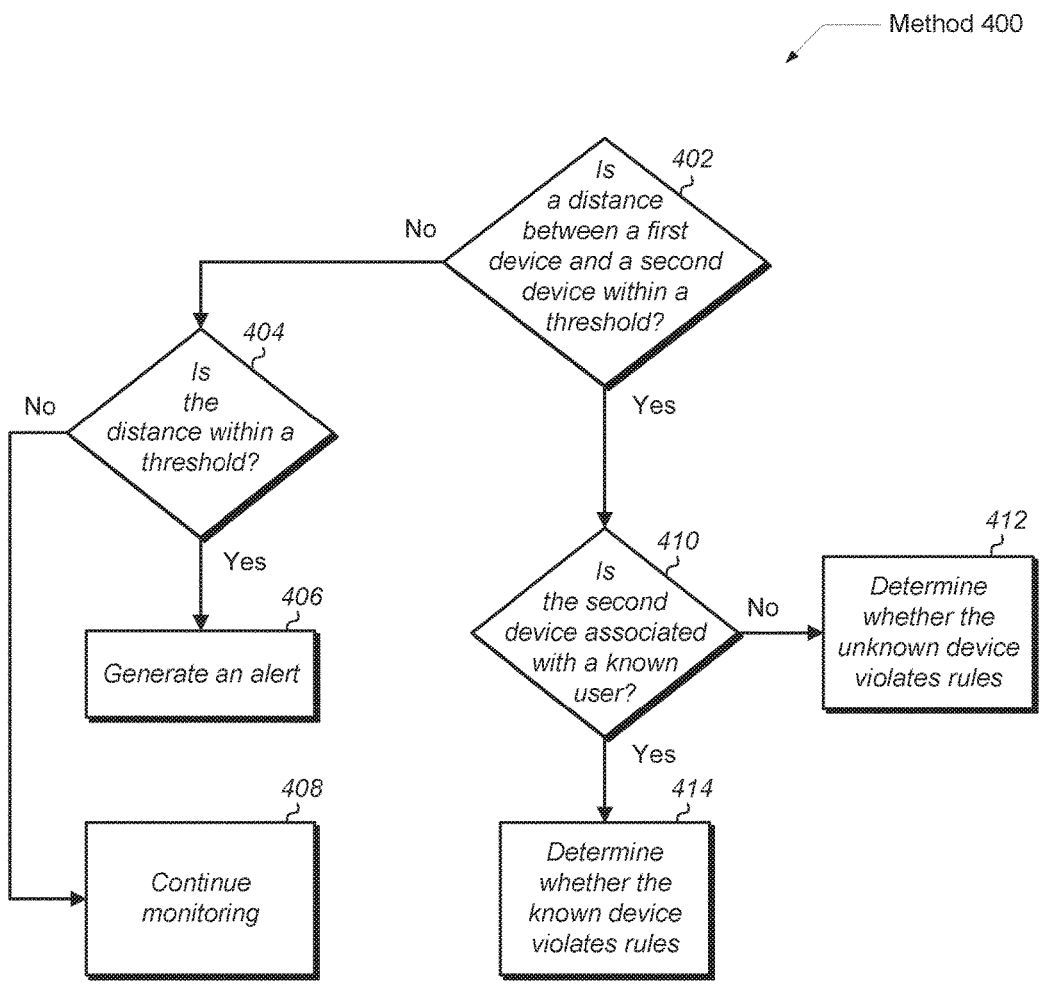
FIG. 4 is a generalized flow diagram illustrating one embodiment of a method for monitoring physical proximity of mobile devices using communication of the mobile devices and identification of the users.

Referring now to FIG. 4, one embodiment of a method 400 for monitoring mobile devices is shown. As described earlier, multiple methods may be used to determine a distance between a first mobile device and a second mobile device. The first mobile device may be a mobile device registered with a monitoring service. If the distance is not within a threshold ("no" branch of the conditional block 402), and the distance is not expected to be within the threshold ("no" branch of the conditional block 404), then monitoring of the communication of the devices continues (block 408). However, if the distance is expected to be within the threshold ("yes" branch of the conditional block 404), then an alert is generated (block 406). In various embodiments, the threshold may be measured in terms of actual or estimated distance (e.g., based on physical location coordinates), based on signal strength between two devices, or otherwise.

If the distance is within a threshold ("yes" branch of the conditional block 402), and the second mobile device is not associated with a known user ("no" branch of conditional block 410), then it is determined whether the unknown device violates rules (block 412). For example, steps later described in method 600 of FIG. 6 may be used. However, if the second mobile device is associated with a known user ("yes" branch of conditional block 410), then it is determined whether the known device violates rules (block 414). For example, steps later described in method 500 of FIG. 5 may be used.

Figure 5:
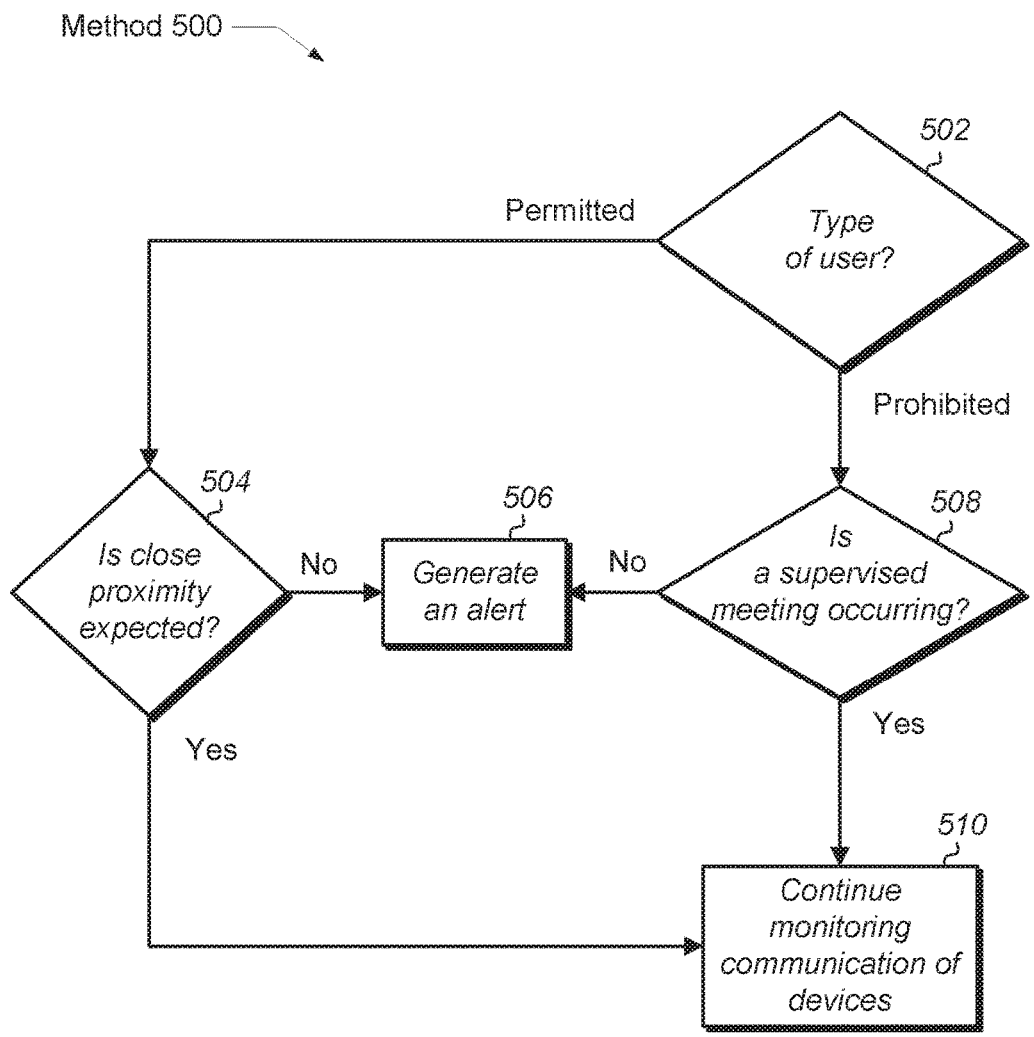
FIG. 5 is a generalized flow diagram illustrating one embodiment of a method for determining whether a device associated with a known user causes alerts.

Turning now to FIG. 5, one embodiment of a method 500 for determining whether a device associated with a known user causes alerts is shown. If the known user associated with the mobile device type is a permitted user ("permitted" branch of the conditional block 502) and the close proximity is not expected ("no" branch of the conditional block 504), then an alert is generated (block 506). For example, a sports coach may be a permitted user, but only during scheduled sports practices. Similarly, a teacher may be a known user, but close proximity is only expected during class times with the teacher. If the close proximity is expected ("yes" branch of the conditional block 504), then monitoring of the communication of the devices may continue without generation of an alert (block 510).

If the known user associated with the mobile device type is a prohibited user ("prohibited" branch of the conditional block 502) and a supervised meeting is not occurring ("no" branch of the conditional block 508), then an alert is generated (block 506). For example, close proximity of a child to a prohibited student during a class together may be deemed a supervised meeting that does not generate an alert.

If a supervised meeting is occurring ("yes" branch of the conditional block 508), then monitoring of the communication of the devices continues (block 510) without generation of an alert.

Figure 6:
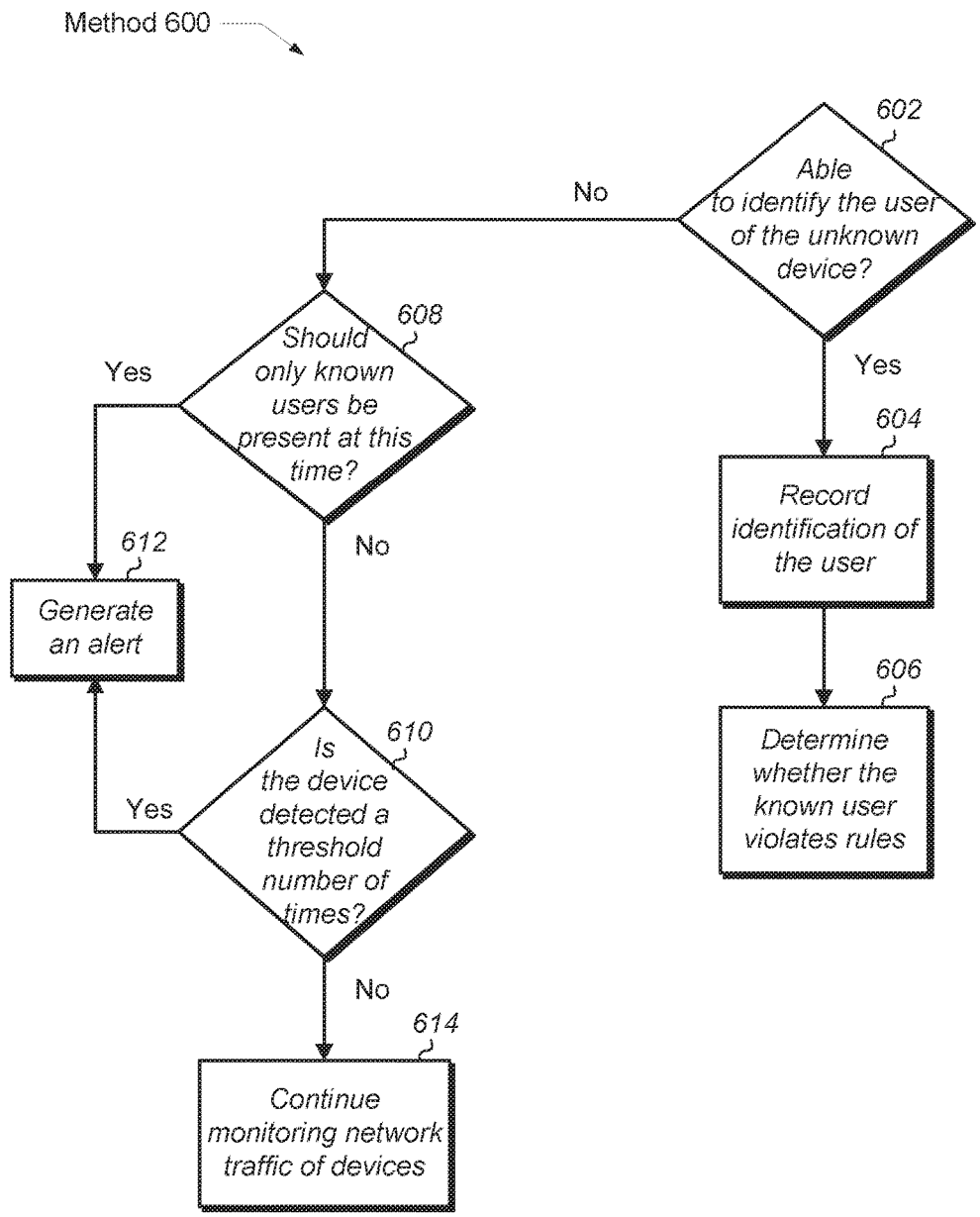
FIG. 6 is a generalized flow diagram illustrating one embodiment of a method for determining whether a device associated with an unknown user causes alerts.

Turning now to FIG. 6, one embodiment of a method 600 for determining whether a device associated with an unknown user causes alerts is shown. If it is not possible to identify the unknown user of the device at this time ("no" branch of the conditional block 602), and only known users are expected to be present at this time ("yes" branch of the conditional block 608), then an alert is generated (block 612). Similarly, if an unknown user/device can be present at this time ("no" branch of the conditional block 608), but the unknown device has been detected a threshold number of times, such as within a given time period ("yes" branch of the conditional block 610), then an alert is generated (block 612). If the unknown device has not been detected a threshold number of times ("no" branch of the conditional block 610), then monitoring of the communication of the devices continues (block 614).

A variety of conditions may be used to determine whether to generate an alert when an unidentified user is detected to be in close proximity of the person of interest associated with the registered mobile device. For example, an alert may be generated when the user associated with the another mobile device is an unidentified user and the other mobile device is detected to be at least one of in close proximity to the registered mobile device for greater than a threshold amount of time, in close proximity to the registered mobile device a threshold number of times within a given time period, and in close proximity to the registered mobile device at a particular time. Other conditions for detecting rule infractions and consequently generating an alert are possible and contemplated.

By looking up one or more other registries or databases that store mappings of user identities and unique identifiers of mobile devices, it may be possible to identify the unknown user of the mobile device. If it is possible to identify the unknown user of the device at this time ("yes" branch of the conditional block 602), then the found identification is recorded (block 604). For example, one or more tables, registries and databases may be updated with the found identification. Additionally, it is determined whether the known user violates rules (block 606). For example, steps previously described in method 500 of FIG. 5 may be used.

Figure 7:
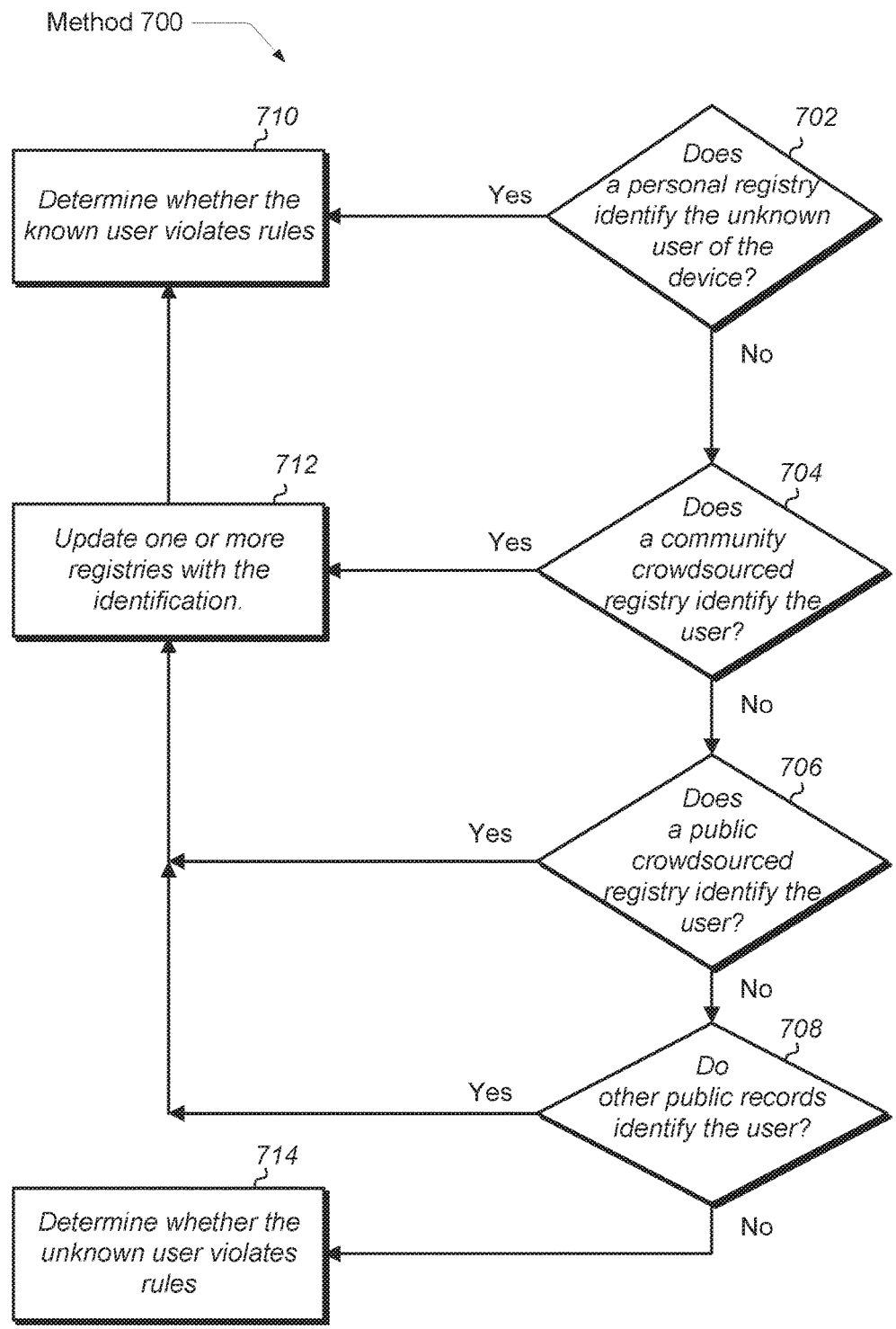
FIG. 7 is a flow diagram illustrating one embodiment of a method for identifying the user associated with a given mobile device.

Referring now to FIG. 7, one embodiment of a method 700 for identifying the user associated with a given mobile device is shown. If a lookup of a personal registry identifies the unknown user of the device ("yes" branch of the conditional block 702), then a determination is made as to whether the known user violates a rule (block 710). For example, steps previously described in method 500 of FIG. 5 may be used. If the lookup of the personal registry does not identify the unknown user of the device ("no" branch of the conditional block 702), but a community-based crowdsourced (crowdsourced information particular to a given community) registry does identify the unknown user ("yes" branch of the conditional block 704), then one or more tables, registries, and databases are updated with the identification (block 712). Following this, control flow of method 700 moves to block 710.

If the lookup of the community-based crowdsourced registry does not identify the unknown user ("no" branch of the conditional block 704), but a lookup of one or more other available crowdsourced databases identifies the unknown user ("yes" branch of the conditional block 706), then control flow of method 700 moves to block 712. Similarly, if the lookup of the other data sources does not identify the unknown user ("no" branch of the conditional block 706), but a lookup of other public records identifies the unknown user ("yes" branch of the conditional block 708), then control flow of method 700 moves to block 712. Otherwise ("no" branch of the conditional block 708), it is determined whether the unknown user violates rules (block 714). For example, steps previously described in method 600 of FIG. 6 may be used. The lookups may progress as shown from smaller, more targeted, registries to larger, more general, registries storing mapping information that may identify the unknown user. The other public records may not store mapping information between the user identity and the unique identifier of an associated mobile device, but rather, these records may identify the unknown user through associations with other people, organizations, and events and so on.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a first mobile device; and
    a server;
    wherein the first mobile device is configured to:
        detect a communication conveyed by a second mobile device, wherein the second mobile device is within range of the first mobile device and the communication conveyed by the second mobile device includes an identifier that is unique to the second mobile device;
        retrieve the identifier corresponding to the second mobile device from the communication; and
        send the retrieved identifier to the server;
    wherein the server is configured to:
        receive the identifier;
        search stored data that associates identifiers to users; and
        generate an alert responsive to determining the identifier corresponding to the second mobile device is associated with a given condition, wherein the given condition is associated with one or more rules regarding generation of alerts for designated individuals based at least in part a user associated with the second mobile device.

2. The system as recited in claim 1, wherein to detect the communication and retrieve the identifier, the first mobile device is configured to capture wirelessly transmitted data of the second mobile device and identify the identifier within the wirelessly transmitted data.

3. The system as recited in claim 2, wherein the first mobile device is further configured to send an indication of a distance between the first mobile device and the second mobile device to the server.

4. The system as recited in claim 3, wherein the indication of a distance comprises an indication of a signal strength.

5. The system as recited in claim 2, wherein determining the identifier corresponding to the second mobile device is associated with a given condition comprises determining a user associated with the second mobile device is identified as a prohibited user.

6. The system as recited in claim 2, wherein determining the user associated with the second mobile device is identified as a prohibited user comprises:
    accessing an account associated with the first mobile device;
    determining the identifier corresponding to the second mobile device is registered with the account; and
    determining the identifier corresponding to the second mobile device is identified as corresponding to a prohibited user.

7. The system as recited in claim 1, wherein determining the identifier corresponding to the second mobile device is associated with a given condition comprises:
    determining a user associated with the second mobile device is an unidentified user; and
    the second mobile device has been detected to be at least one of:
        in close proximity to the first mobile device for greater than a threshold amount of time;
        in close proximity to the first mobile device a threshold number of times within a given time period; and
        in close proximity to the first mobile device at a particular time.

8. The system as recited in claim 1, wherein the server is further configured to determine one or more of an age range, a job title, and a student status corresponding to a user associated with the second mobile device.

9. The system as recited in claim 8, wherein the server is further configured to determine a user associated with the second mobile device is a permissible user responsive to determining the user associated with the second mobile device meets a requirement corresponding to one or more of said age range, said job title and said student status.

10. A method comprising:
    detecting by a first mobile device a communication conveyed by a second mobile device, wherein the second mobile device is within range of the first mobile device and the wherein the communication conveyed by the second mobile device includes an identifier that is unique to the second mobile device;
    retrieving, by the first mobile device, the identifier from the communication;
    and
    sending the retrieved identifier to a server;
    receiving the unique identifier at the server;
    searching stored data that maps identifiers to users; and
    generating, by the server, an alert responsive to determining the identifier corresponding to the second mobile device is associated with a given condition, wherein the given condition is associated with one or more rules regarding generation of alerts for designated individuals based at least in part on users associated with mobile devices.

11. The method as recited in claim 10, wherein to detect the communication and retrieve the unique identifier, the method comprises the first mobile device capturing wirelessly transmitted data of the second mobile device and identifying the identifier within the wirelessly transmitted data.

12. The method as recited in claim 11, further comprising the first mobile device sending an indication of a distance between the first mobile device and the second mobile device to the server.

13. The method as recited in claim 12, wherein the indication of a distance comprises an indication of a signal strength.

14. The method as recited in claim 11, wherein determining the identifier corresponding to the second mobile device is associated with a given condition comprises determining a user associated with the second mobile device is identified as a prohibited user.

15. The method as recited in claim 11, wherein determining the user associated with the second mobile device is identified as a prohibited user comprises:
   accessing an account associated with the first mobile device;
   determining the identifier corresponding to the second mobile device is registered with the account; and
   determining the identifier corresponding to the second mobile device is identified as corresponding to a prohibited user.

16. The method as recited in claim 10, wherein determining the identifier corresponding to the second mobile device is associated with a given condition comprises:
   determining a user associated with the second mobile device is an unidentified user; and
   the second mobile device has been detected to be at least one of:
      in close proximity to the first mobile device for greater than a threshold amount of time;
      in close proximity to the first mobile device a threshold number of times within a given time period; and
      in close proximity to the first mobile device at a particular time.

17. The method as recited in claim 10, further comprising determining one or more of an age range, a job title, and a student status corresponding to a user associated with the second mobile device.

18. The method as recited in claim 17, further comprising determining a user associated with the second mobile device is a permissible user responsive to determining the user associated with the second mobile device meets a requirement corresponding to one or more of said age range, said job title and said student status.

19. A non-transitory computer readable storage medium comprising program instructions, wherein the program instructions are executable by a processor to:
   detect by a first mobile device a communication conveyed by a second mobile device, wherein the second mobile device is within range of the first mobile device and the wherein the communication conveyed by the second mobile device includes an identifier that is unique to the second mobile device;
   retrieve, by the first mobile device, the identifier from the communication;
   send the identifier to a server;
   receive the unique identifier at the server; and
   search stored data that associates identifiers to users; and
   generate an alert, by the server, responsive to determining the identifier corresponding to the second mobile device is associated with a given condition, wherein the given condition is associated with one or more rules regarding generation of alerts for designated individuals based at least in part on users associated with mobile devices.

20. The non-transitory computer readable storage medium as recited in claim 17, wherein to detect the communication and retrieve the identifier, the program instructions are executable to cause the first mobile device to capture wirelessly transmitted data of the second mobile device and identify the identifier within the wirelessly transmitted data.

* * * * *